United States Patent [19]

Lovell et al.

[11] 3,730,822

[45] May 1, 1973

[54] COMPOSITE OF FABRIC WITH FLEXIBLE BACKING

[75] Inventors: John A. Lovell, Monroe Falls; Philip G. Harris, Akron, both of Ohio

[73] Assignee: The Goodyear Tire & Rubber Company, Akron, Ohio

[22] Filed: Mar. 29, 1971

[21] Appl. No.: 129,187

[52] U.S. Cl. ............... 161/66, 156/72, 156/327, 161/67, 161/159, 161/162, 161/190
[51] Int. Cl. ............... D05c 15/04, D05c 17/00
[58] Field of Search ............ 161/66, 67, 190, 161/159, 162; 117/161 KP; 156/72, 327; 112/410

[56] References Cited

UNITED STATES PATENTS

| | | | |
|---|---|---|---|
| 3,519,526 | 7/1970 | Carey et al. | 161/66 |
| 3,475,200 | 10/1969 | Kallert et al. | 117/161 KP |
| 3,506,479 | 4/1970 | Breens et al. | 161/66 |

*Primary Examiner*—William A. Powell
*Attorney*—F. W. Brunner and H. C. Young, Jr.

[57] ABSTRACT

A composite structure suitable for use as a carpet which comprises a yarn tufted through a primary backing to create yarn bundles on its underside, where the yarn bundles are adhered to the primary backing and substantially encapsulated by a backsizing comprising an inorganic water-insoluble granular material of an average specific gravity greater than 1 and a flexible cured polyurethane binder therefor applied as a liquid polyurethane reaction mixture substantially free of volatile solvent. The invention has particular utility in creating carpet with a flexible backsizing where the backsizing is applied as a granular material with a liquid reaction mixture without striking through to the face of the carpet.

8 Claims, No Drawings

COMPOSITE OF FABRIC WITH FLEXIBLE BACKING

This invention relates to a composite structure comprising a fabric bonded to a flexible backing. The invention more particularly relates to a carpet, such as a tufted carpet, backsized with a flexible composition.

Carpets can be produced commercially by tufting yarn into a primary backing, such as woven or a nonwoven fabric or film. The bottom surface portion of the primary backing can then be coated with a flexible polymeric material to penetrate and encapsulate a substantial portion of the yarn bundle of the tuft extending below the primary backing and anchor or lock the tuft to the backing. The polymeric integral backing coat which anchors the yarn tufts is sometimes called a bundle wrap. The backsizing also provides dimensional stability and tends to retard creeping. The polymeric backing may further provide a bottom friction surface with good physical properties, such as tensile and elongation.

These integral and flexible polymeric carpet backings and bundle wrappings have been provided, for example, by applying rubber latices or by applying polyurethane reaction mixtures in solution to the back of the carpet to coat the yarn bundles followed by curing and drying the coating. It is typically required that only a skim coating of the solution is applied to prevent striking through the primary backing and penetrating the face of the carpet. Penetration of the carpet face creates unwanted polymeric lumps among the upper tufts rendering it defective for most purposes. The solvents of the latex and polyurethane systems enhance the penetration of the primary backing and encapsulation of a substantial portion of the fibers, particularly the tufted yarn bundles, but they also promote striking through. Thus, thick layers are difficult to achieve without multiple coatings and required intermediate drying and and curing steps. Polyurethanes are preferred over the latices for many applications since they can be formed in situ on the carpet from the reaction mixtures dissolved in volatile solvents and since they also can have good physical properties, particularly abrasion resistance, as well as good tensile and elongation.

However, the volatile solvents typically used for the polyurethane reaction mixtures, which must ultimately be removed, are toxic or are fire hazards and thus present attendant safety hazards for commercial applications. Furthermore, even the polyurethane backsizing may not add sufficient weight and dimensional stability to enable large carpet sections to lie flat on a floor without excessive unwanted creeping because of its average specific gravity of less than 1, and usually less than about 0.98, unless an excessively thick and cumbersome coating is used.

It is, therefore, an object of this invention to provide a tufted carpet composition with dimensional stability comprising a tufted carpet having an adherent protective and strengthening flexible backsizing or bundle warp, with good physical properties which can be expediently bonded to the fabric and yarn bundles of the carpeting as a relatively thick layer by topcoating with the fabric's bottom surface and yarn bundles thereon with a liquid reaction mixture, substantially free of volatile solvents, without striking through to the face of the carpet, and then cured to a flexible solid backing.

In accordance with this invention, it has been found that a composite structure, suitable for use as a carpet, comprises a yarn tufted through a primary backing of a woven or non-woven fabric or film, preferably a woven fabric or woven thermoplastic film to create yarn bundles on its underside, where the said yarn bundles are integrally adhered to and substantially encapsulated by a surface coating of a flexible backsizing and bundle wrap, adhered to the back of the primary backing, said flexible backsizing comprising an inorganic water insoluble granular material of an average specific gravity of greater than 1 and a flexible cured polyurethane binder therefor, and for bonding to the fabric, wherein the said flexible backsizing is deposited by applying a mixture substantially as a topcoat to the back surface of the primary backing and corresponding yarn bundles comprising from about 50 to about 400 parts, and preferably in the range of about 100 to about 250 parts, by weight of the said granular material per 100 parts by weight of a liquid polyurethane reaction mixture substantially free of volatile solvent and curing the reaction mixture.

Thus, in the practice of this invention, backsized tufted carpets are provided having dimensional stability by forming in situ an adherent protective flexible backing thereon from a mixture of an inorganic water insoluble granular material and a liquid polyurethane reaction mixture without a normally attendant volatile solvent fire or explosive hazard.

The flexible polymeric backing is applied to the primary backing substantially as a topcoat preferably having a cured thickness in the range of about 10 to about 200 mils. That is, as a topcoat it does not penetrate the primary backing's face by striking through from the backside, although it is understood and desired that most, if not all, of the surface fibers of the bottom of the primary backing becomes substantially coated. The reaction mixture can be coated onto the primary backing by the normal techniques such as by spreading, dipping roller-coating and spraying, preferably spreading. It is generally required that the yarn bundles, the portion of the tuft extending below or from the bottom of the primary backing, are substantially encapsulated by the applied flexible polyurethane backsizing. Thus, it is desired that the yarn bundles are at least 90 percent and preferably at least about 95 percent encapsulated to sufficiently lock them in the primary backing.

The composition for the flexible backsizing and bundle wrap of this invention can be solid or cellular, preferably solid. The flexible composition, when solid, is preferably characterized by having an ultimate tensile strength in the range of about 300 to about 2,000 pounds per square inch (psi) measured as a standard dumbbell sample by an Instron tester at a crosshead speed of 5 inches per minute at 25° C., and a corresponding ultimate elongation typically in the range of about 700 percent to about 200 percent at about 25° C. according to generally accepted rubber testing procedures. Thus, the flexible composition may have an ultimate tensile strength of about 300 psi and an elongation in the range of about 700 percent or a tensile strength of about 2,000 psi with an elongation in the range of about 200 percent at about 25° C. Therefore, the composite structure of this invention comprising the tufted fabric adhered to the flexible backsizing composition has its usefulness particularly enhanced by the substantial physical properties of the backing even though the composition is applied as a topcoat without solvent.

If it is desired that the flexible bundle wrap composition be cellular in nature, then a small amount of water or various well-known inert fluid-expanding or blowing agents are mixed with the reaction mixture and are allowed to expand the reaction mixture to a stable foam structure upon curing. It is normally required that the blowing agents be gaseous at or within about 5° C. above room temperature or about 25° C. Various amounts can be used depending somewhat upon the type of cellular structure desired.

Representative examples of various blowing agents include air, nitrogen, carbon dioxide and halogenated hydrocarbons, exemplary of which are methylene chloride, trichloromonofluoromethane, dichlorodifluoromethane and 1,2-dichlorotetrafluoroethane. The foamable polyurethane reaction mixture can also contain relatively small amounts of various catalysts well known to those skilled in the art to increase its rate of reaction as well as various surfactive agents to assist in controlling the cell structure of the resultant foam.

In the practice of this invention, the primary backing to which the flexible bundle wrap or backsizing is to be applied can be woven or non-woven. The primary backing is typically of jute, although it can be of other textile fibers or of plastic films. Plastic films can be used preferably as strips of film interwoven to form a mat. Flexible thermoplastic polyolefin films are desired, such as polypropylene. The textile fibers for the fabric or for the yarn can be of various materials representative of which are cellulose, such as cotton, rayon, polyesters such as those having the structure of ones derived from dicarboxylic acids and glycols, wool, flax, paper, asbestos, nylon and glass. It is preferred that the filaments or strands of the woven or non-woven fabric be sufficiently tight (close) to prevent the polyurethane reaction mixture topcoat from striking through by gravity flow at about 25° C. before it sets up. For example, the filamentary fabric can comprise a non-woven fibrous batt having a weight in the range of about 10 to about 50 ounces per square yard comprised of fibers having an average staple length in the range of about 1 to about 5 inches with a denier per filament of in the range of about 1 to about 5.

The inorganic granular materials for the backing composition are required to be substantially inert or non-reactive with the polyurethane reaction mixture essentially water insoluble and to have an average specific gravity of greater than one or, more desirably, in the range of about 1.2 to about 6, preferably about 2 to about 4. They are generally preferred to have a particle size of from about 25 to about 500 and more preferably from about 100 to about 400 U.S. Standard mesh size. Representative examples of such granular materials are those selected from silicates, particularly aluminum silicates such as clay, calcium carbonate such as chalk and whiting, aluminum hydrate, zinc oxide, titanium dioxide, feldspar and various barytes.

The polyurethane binders for the backsizing are required to be prepared from polyurethane reaction mixtures which are liquid at typical preparation application temperatures, such as about 25° C. to about 30° C. They should be characterized by being sufficiently fluid at about 30° C. and preferably at about 25° C., to be easily sprayable by ordinary spray techniques. Because these liquids are expected to be non-Newtonian by nature, their sprayability is related to both viscosity and applied shear rates at these temperatures. Generally their sprayability should be equivalent to a Newtonian fluid having a viscosity in the range of about 2,000 to about 1,000,000 centipoises at about 25° C. The reaction mixtures are further required to be substantially free of volatile solvents, that is, solvent having boiling points at atmospheric pressure below about 200° C. and preferably below about 85° C. that are essentially non-reactive with the reaction mixture. Solvents boiling above about 200° C. such as processing oils or waxes are considered herein more of a non-volatile type and in the nature of extenders. Thus, the reaction mixture is required to contain less than about 5 and preferably less than about 2 weight percent of the volatile solvent based on the polyurethane reaction mixture. Of course, it is preferred that the reaction mixture is essentially free of water, where it is desired to produce essentially non-cellular or solid backings.

Representative examples of the various volatile organic solvents which are essentially non-reactive with the polyurethane reaction mixture and of which the reaction is to substantially free include benzene, toluene, liquid ketones, such as acetone, methyl ethyl ketone, diethyl ketone, methyl isoamyl ketone, diisobutyl ketone, cellosolve acetate, dioxane and chlorinated hydrocarbon solvents, such as trichloroethylene, methylene chloride, etc. The small amount of volatile solvent can be mixed with the polyurethane reaction mixture where it may be desirable to reduce its viscosity somewhat for spraying applications.

If desired, the flexible backsizing composition comprising the inorganic granular material and the flexible polyurethane binder therefor can be extended with up to about 10 parts and preferably from about 2 to about 5 parts by weight of an extender oil or wax based on the liquid polyurethane reaction mixture and having a boiling point of at least about 200° C. so long as the resulting backing composition has the required tensile strength and elongation. In the practice of this invention, the extender oil or wax is typically introduced into the backsizing composition by mixing it with one of the reactants of the polyurethane reaction mixture before it is applied.

The extender oils are those generally known in the art as rubber processing oils, rubber extending oils or compatible rubber processing oils. These terms are used to refer to oils that are miscible with the flexible cured polyurethane and do not excessively migrate to its surface.

The extender oils or rubber processing oils are normally derived from petroleum although they can also be derived from coal tar and other sources such as rosin oils. Representative processing oils are more fully described in U.S. Pat. No. 3,081,276. The processing oils are usually composed primarily of paraffinic hydrocarbons, naphthenic hydrocarbons and aromatic hydrocarbons. Such oils are well-known commercial oils normally used in rubber compounding which are generally high-boiling petroleum fractions obtained after gasoline, fuel oil and other lower boiling materials are removed by distillation. They normally have a viscosity of from about 10 centipoises at 100° C. up to semi-solid materials softening at about 40° C. to about 90° C. They usually have a boiling point of at least about 200° C. and higher. For example, many processing oils have a boiling point of at least about 245° C. at 10 millimeters of mercury. They normally have a specific gravity (60/60° F.) of from about 0.9 to about 1.05.

The waxes are those generally known in the art as rubber process aids or ozone inhibitors for rubber. The waxes are normally derived from petroleum in much the same fashion as the extender oils except they are always solid at room temperature and melt in the range of 50° C. to 200° C. They are typically referred to as paraffin waxes.

The liquid polyurethane reaction mixtures used in the practice of this invention are typically prepared from liquids reactive hydrogen-containing polymeric materials, an organic polyisocyanate and, if desired, curatives selected from hydrocarbon diols and diamines having primary and secondary amino groups, preferably primary amino groups. It is to be understood that the polyurethanes referred to in this specification may also contain polyurea linkages. The liquid reactive hydrogen-containing polymeric material used is preferably liquid and sprayable at about 25° C. and comprises at least one member selected from the group consisting of materials having a molecular weight from about 700 to about 5,000 and preferably from about 1,000 to about 3,000 selected from polyester polyols, polyether polyols and hydroxyl terminated polymers of conjugated diene hydrocarbons having a hydroxyl functionality of from about 2 to about 3 and preferably from about 2.1 to about 2.5. Generally the polyether polyols and hydroxyl terminated diene hydrocarbon polymers are the preferred active hydrogen-containing material where high strength and solvent resistance are desired.

The hydroxyl terminated polymers and copolymers of the diene hydrocarbons are typically polymers of 1,3-conjugated diene hydrocarbons having four to six carbon atoms and copolymers thereof with compounds selected from styrene, acrylonitrile and ethyl acrylate. Representative of the polymers are liquid hydroxyl terminated polymers of 1,3-butadiene, polymers of isoprene, their copolymers, copolymers of 1,3-butadiene and styrene, copolymers of 1,3-butadiene and acrylonitrile, copolymers of 1,3-butadiene and ethyl acrylate and copolymers of 1,3-butadiene and chloro-1,3-butadiene. Particularly useful polyols are those of polybutadiene, polyisoprene, and copolymers of butadiene-isoprene, butadiene-styrene. The required polyols typically have a viscosity at about 30° C. of from about 10 poise to about 150 poise and more generally from about 20 poise to about 100 poise.

The required liquid polyester polyols typically have a hydroxyl functionality of about 2 with an equivalent weight of from about 200 to about 1,000 with a structure of the type obtained from dicarboxylic acids having from four to 10 carbon atoms and hydroxyl terminated hydrocarbon diols having from two to eight carbon atoms.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about 1 to 20 percent by weight of a triol or higher polyfunctional polyol or polyfunctional acid can be present to produce branching in the polyurethane polymer.

The liquid polyether polyols typically have a hydroxyl functionality of at least 2 and preferably 2 to 3, a molecular weight of about 500 to about 3,500 and preferably 500 to 2,000, a viscosity at about 30° C. of from about 50 to about 200 centipoises and have the general structure of those prepared by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or with a polycarboxylic acid such as phthalic acid. The polyether polyols include polyalkylenearyl ether glycols or triols, polytetramethylene ether glycols, polyalkylene etherthioether glycols or triols, and alkyd resins. Generally, the propylene ether glycols are the preferred polyether glycols.

The organic polyisocyanates used to prepare the polyurethanes include various polyisocyanates having an isocyanato group content of from 2 to about 3 and particularly the organic diisocyanates. Generally the organic diisocyanates and dimers and trimers thereof are preferred. The organic polyisocyanates can be aromatic, aliphatic or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis (cyclohexylisocyanate), isophorone diisocyanate, such as 3-isocyanato methyl-3.5.5-trimethyl cyclohexyl isocyanate, 1,5-tetrahydronaphthalene diisocyanate and polymers, such as dimers and trimers of such diisocyanates. For the purpose of the present invention, the toluene-diisocyanates, diphenylmethane-4,4'-diisocyanate, isophorone diisocyanate, 3,3'-dimethyl-4,4'-bisphenylene diisocyanate and their polymers such as dimers and trimers are generally preferred although the diisocyanates having isocyanato groups connected to nonbenzenoid carbon atoms are preferred where color retention is important.

The polyurethane binder for the backsizing and bundle wrap of this invention can typically be prepared by forming a liquid polyurethane reaction mixture by (A) reacting a reactive hydrogen-containing polymeric material, usually required to be a polymeric polyol, with a polyisocyanate to form an isocyanate terminated polyurethane sometimes called a prepolymer which is then mixed with a diamine or a hydrocarbon diol, if a curative is desired, or (B) the mixture can be formed by the well known one-shot method. For the first method, the prepolymer is typically prepared by reacting the reactants in proportions such that the ratio of isocyanate groups to the reactive hydrogen-containing groups (hydroxyl groups) of the reactive hydrogen-containing polymeric material is from about 1.1/1 to about 12/1 and preferably about 1.5/1 to about 4.0/1, although for the one-shot method, the ratio is typically in the range of about 0.6/1 to about 3/1, preferably about 0.8/1 to about 2/1. These materials are generally reacted at temperatures from about 20° C. to about 150° C. and cured to form the polyurethane polymer.

If the one-shot method is used, the polymeric polyol, polyisocyanate and other curatives, such as the diamines or diol if used, are simply applied together with the granular material and allowed to cure. When the polymeric polyols or their mixtures have a hydroxyl functionality greater than 2, such as about 2.2 to about 3, the other curatives are not normally needed. If the prepolymer method is used, the diamine or hydrocarbon diol curative is mixed with the prepolymer to form a reactive mixture and applied with the granular material.

The diamine or diol curative, when desired, is used in a ratio of from about 0.5/1 to about 1.5/1 and preferably from about 0.8/1 to about 1.0/1 amino groups of the diamine or hydroxyl groups of the diol for each isocyanato group in excess of the reactive hydrogen groups of the reactive hydrogen-containing polymeric material. The cement is typically mixed with the curative at a temperature of from about 20° C. to about 50° C. and the mixture then typically cured at a temperature of from about 20° C. to about 150° C.

Representative of the various typical hydrocarbon diol curatives are ethylene glycol, 1,3-propane diol, 1,4-butane diol and glycerol, although others can be used. It is preferred that they are liquid at about 30° C.

Representative of various diamine curatives include aliphatic and aromatic diamines having primary amino groups and include compounds referred to in this specification as substituted methyl amine compounds.

Representative of the substituted methyl amine compounds are those having the structure of the formula 1:

(1)

wherein $R_1$, $R_2$ and $R_3$ are individually selected from the group consisting of (a) hydrogen radicals, alkyl, cycloalkyl, aryl, alkaryl, and aralkyl radicals. Representative of such radicals are alkyl radicals having from one to forty carbon atoms such as methyl, ethyl, propyl, isopropyl, butyl, isobutyl, amyl, isoamyl, hexyl, isohexyl, heptyl, octyl, duodecyl and tetracontyl radicals; cycloalkyl radicals such as cyclobutane, cyclopentane, cyclohexane, cycloheptane and cyclooctane; aryl radicals such as phenyl and naphthyl radicals; alkaryl radicals such as tolyl and xylyl radicals, and aralkyl radicals such as benzyl radicals; and (b) substituted alkyl, cycloalkyl, aryl, alkaryl and aralkyl radicals where the substituents are selected from at least one of the group consisting of nitrogen, hydrogen, carbon, oxygen, sulfur, fluorine, chlorine, bromine, iodine and phosphorous. Representative examples of such substituted radicals are amino radicals, imino radicals, and radicals containing amino groups, imino groups, halo groups, ether groups and thioether groups.

Particularly representative substituted methyl amines are primary diamines having their amino groups attached to non-benzenoid carbon atoms.

Further representative examples of the said substituted methyl amino compounds are compounds prepared by the method which comprises reacting the substituted methyl amine compound of formula 1 with an aldehyde or ketone. Various aldehydes can be used, representative of which are formaldehyde, acetaldehyde, propionaldehyde and benzaldehyde. Various ketones can be used representative of which are acetone, methyl ethyl ketone, methyl isobutyl ketone, diisobutyl ketone, methyl n-amyl ketone, methyl-i-amyl ketone and acetophenone. These compounds are generally called aldimines and ketimines.

Representative examples of the various diamines, including the substituted methyl amine compounds, are ethylene diamine, trimethylene diamine, tetramethylene diamine, hexamethylene diamine and dimethyl hexamethylene diamine; isophorone diamine including 3-amino methyl-3.5.5-trimethyl cyclohexyl amine, 1,4-cyclohexane bis methyl amine, 4,4'-diamino-dicyclohexyl methane, meta xylene diamine, paraxylene diamine, tetrachloroparaxylene diamine, cyclobutane-1,2 bis methylamine, menthane diamine, imino bis propylamine, bis(amino propyl) piperazine, diethylene triamine, triethylene tetramine, triethylene pentamine, o- and m-phenylene diamine, o- and m-dichlorobenzidine, 2,5-dichlorophenylene diamine, 3,3'-dichloro-4,4'-diamino diphenyl methane, the naphthylene diamines, tolylene 2,4-diamine, p-amino benzl aniline, and o- and p-amino diphenyl amine.

If desired, a catalyst can be used to increase the reaction rate between the reactive hydrogen containing material and the polyisocyanate. Suitable catalysts are the well known catalysts typically used for polyurethanes. Representative of the various catalysts are dibutyltin dilaurate, stannous octoate, magnesium oxide, butylaldehyde-butylamine condensation product, 2-mercaptobenzothiazole, cobalt naphthenate and tertiary amines such as triethylene diamine, methylated tetraethylene tetramine and hexamethylene tetramine. It has been found that the organo-tin compounds such as dibutyltin dilaurate and stannous octoate are quite useful in this regard.

The practice of this invention is further illustrated by reference to the following examples which are intended to be representative rather than restrictive of the scope of the invention.

EXAMPLE I

To a reactor was charged 100 parts of a polybutadiene polyol having an equivalent weight of about 1,430, a viscosity at about 30° C. of about 53 poise determinable by a Brookfield viscometer, and a hydroxyl functionality of about 2.1. With the polybutadiene polyol was mixed 15 parts of titanium dioxide having a particle size somewhat smaller than about 325 mesh size, 8 parts of zinc oxide having a particle size somewhat smaller than about 100 mesh size, and 12 parts of calcium carbide having a particle size somewhat smaller than about 100 mesh size.

To the mixture at about 25° C. was added 8.3 parts of hydrogenated diphenylene methane-4,4'-diisocyanate, (obtainable from the duPont de Nemours under the tradename Hylene W) and 0.075 part of dibutyltin dilaurate. The mixture was stirred and coated by spreading onto the back of carpet comprising a polyester yarn tufted into a square woven jute fabric backing which was taken directly from the loom. The mixture was allowed to flow over the fabric, achieve at least about a 95 percent encapsulation of the yarn bundles and stand for about 4 hours at about 25° C. to set and cure. The mixture did not flow through the fabric but, upon curing, adhered strongly to the fabric backing and yarn bundles, forming an anchoring bundle wrap, thus resulting in a fabric composite suitable for commercial use as a carpet.

A portion of the cured flexible backsizing composition was determined to have an ultimate tensile strength of about 400 psi, an elongation of about 675 percent and a Shore A hardness of about 38 at about 25° C.

EXAMPLE II

To a first reactor was charged 157 parts of a liquid poly(propylene glycol) polyol, (obtainable from the Wyandotte Chemical Co. under the tradename Wyandotte PPG 1010), having a molecular weight of about 1,000, a viscosity at about 25° C. at about 150 centipoise, and a hydroxyl functionality of about 2. With the polyol was mixed 47.1 parts of titanium dioxide, 25.1 parts of zinc oxide and 37.7 parts of calcium carbonate having particle sizes of about less than about 325 mesh, less than about 100 mesh, and less than about 100 mesh respectively.

To a second reactor was added 147.5 parts of a saturated polymeric polyether triol (obtainable from the Wyandotte Chemical Co. under the tradename Wyandotte TPE 1540), having a molecular weight of about 1,500, a viscosity at about 25° C. at about 340 centipoise, and a hydroxyl functionality of about 3. To the polymeric triol was mixed 44.25 parts of the titanium dioxide, 23.6 parts of the zinc oxide and 35.4 parts of the calcium carbonate used with the poly(propylene glycol) polyol.

The mixtures from each of the two reactors were mixed together. To the resulting mixture was added 85.8 parts of liquid diphenyl methane-4,4'-diisocyanate (MDI), (obtainable from the Upjohn Co. under the tradename Isonate 143 L), and about 0.8 part of dibutyltin dilaurate. The reaction mixture was stirred well and applied by spreading onto a backing of a carpet comprising a polyester yarn-tufted square woven jute backing which was taken directly from the loom. The mixture had a pot life of about 2 to 3 minutes and cured substantially completely at about 25° C. in less than 15 minutes. The mixture did not strike through the fabric but penetrated its surface fibers and provided at least about a 95 percent encapsulation of the yarn bundles which, upon curing, provided an adherent flexible backsizing and an anchoring bundle wrap thereby creating a carpet suitable for commercial use.

A portion of the reaction was cast and cured to form a sheet from which dumbbells were cut to determine tensile and elongation. Its ultimate tensile and elongation at about 25° C. were determinable by an Instron tester with a crosshead speed of 5 inches per minute to be about 1,600 psi and about 195 percent, respectively.

EXAMPLE III

To a reactor was charged 200 parts of a liquid polyester derived from caprolactone and glycol (obtainable from the Union Carbide Corp., under the tradename Niax D-510) having a hydroxyl number of about 210, an equivalent weight of about 268, and a viscosity at about 40° C. of about 165 centipoises. With the polyester polyol was mixed 200 parts of calcium carbonate consisting of 140 parts of calcium carbonate having a particle size somewhat smaller than about 325 mesh and 60 parts of calcium carbonate having a particle size somewhat smaller than about 100 mesh.

To the reactor was then charged 98.6 parts of a polyisocyanate derived from phosgene and an aniline-formaldehyde product (obtainable from the Mobay Chemical Co. under the tradename Mondur MRS) having a percent NCO group content of 31.7 and an equivalent weight of 132.4. To this mixture was then added 0.5 parts of dibutyltin dilaurate as a catalyst.

The reaction mixture was then poured and spread onto the back of a carpet comprising a polyester yarn tufted square woven jute fabric backing which was taken directly from the loom. The mixture was spread over the fabric, allowed to achieve at least about a 95 percent encapsulation of the yarn bundles and cured for 10 minutes at about 25° C. The reaction mixture did not gravity flow and strike through the fabric to the top carpet of the carpet but, upon curing, adhered strongly to the fabric backing and yarn bundles, forming an anchoring bundle wrap, thereby resulting in a composite structure suitable for commercial use as a carpet. A portion of the reaction mixture was cast and cured in a press at about 154° C. for 4 minutes to form a sheet from which standard dumbbells were cut and its ultimate tensile and elongation were determined according to normal rubber testing procedures.

The tensile, as examined with an Instron tester at a crosshead speed of 5 inches per minute, was 1,600 pounds per square inch at about 25° C., and its elongation was about 195 percent.

While certain representative embodiments and details have been shown for the purpose of illustrating the invention, it will be apparent to those skilled in this art that various changes and modifications may be made therein without departing from the spirit or scope of the invention.

What is claimed is:

1. A composite structure, suitable for use as a carpet, comprises a yarn tufted through a primary backing of a woven or nonwoven fabric or film to create yarn bundles on its underside, where the said yarn bundles are integrally adhered to and substantially encapsulated by a surface coating of a flexible backsizing and bundle wrap composition, adhered to the back of the primary backing, said flexible backsizing composition comprising an inorganic water insoluble granular material of an average specific gravity of greater than 1 with a particle size in the range of about 25 to about 500 mesh and a flexible cured polyurethane binder therefor, and for bonding to the fabric, wherein the said flexible backsizing composition is characterized by an elongation at 25° C. of about 200 to about 700 percent and is deposited by applying a non-Newtonian mixture under shear substantially as a topcoat to the back surface of the primary backing and corresponding yarn bundles without striking through said carpet which comprises from about 50 to about 400 parts by weight of the said granular material per 100 parts by weight of a liquid polyurethane reaction mixture substantially free of volatile solvent and curing the reaction mixture, where said non-Newtonian mixture has a sprayability equivalent to a Newtonian fluid having a viscosity in the range of about 2,000 to about 1,000,000 centipoises at 25° C., where said liquid polyurethane reaction mixture comprises an organic polyisocyanate having an isocyanato content of 2 to 3 and a liquid polymeric reactive hydrogen-containing material having a molecular weight in the range of about 700 to about 5,000, so long as it is liquid, selected from polyester polyols, polyether polyols and hydroxyl terminated polymers of conjugated diene hydrocarbons having a hydroxyl functionality of from 2 to about 3 and where the ratio in the reaction mixture of isocyanato groups to hydroxyl groups of the liquid polymeric reactive hydrogen-containing material is in the range of from about 0.6/1 to about 3/1.

2. The composite structure of claim 1 where the primary backing is a woven fabric and the yarn bundles are at least 90 percent encapsulated by the flexible bundle wrap.

3. The composite structure of claim 1 wherein a prepolymer of the polyisocyanate and liquid polymeric reactive hydrogen-containing material is first formed with a ratio of isocyanato groups to hydroxyl groups of said reactive hydrogen-containing material in the range of about 1.1/1 to about 12/1 followed by mixing therewith a curative selected from at least one of the group consisting of hydrocarbon diols and primary diamines where the ratio of hydroxyl and/or amino groups of the curative to the isocyanato groups in excess of the hydroxyl groups of said reactive hydrogen-containing material is in the range of about 0.5/1 to about 1.5/1.

4. The composite structure of claim 1 where the backsizing is extended with up to about 10 parts by weight of an extender oil or wax having a boiling point of at least about 200° C.

5. The composite structure of claim 4 wherein a curative is used with the reaction mixture selected from at least one of the groups consisting of hydrocarbon diols and primary diamines where the ratio of amino groups and/or hydroxyl groups of the curative to isocyanato groups in excess of hydroxyl groups of the liquid polymeric reactive hydrogen-containing material is in the range of about 0.5/1 to about 1.5/1.

6. The composite structure of claim 5 wherein the water insoluble granular material has a particle size in the range of about 25 to about 500 mesh and is selected from at least one of the group consisting of aluminum silicates, calcium carbonate, clay, aluminum hydrates, zinc oxide, titanium dioxide, feldspar and barytes, the polyurethane reaction mixture has a sprayability equivalent to a Newtonian fluid having a viscosity in the range of about 2,000 to about 1,000,000 centipoises at about 25° C., the ratio of isocyanato groups to hydroxyl groups of the said reactive hydrogen-containing material is in the range of about 0.8/1 to about 2/1 and the ratio of amino and/or hydroxyl groups of any primary amine or hydrocarbon diol curative to isocyanato groups in excess of the hydroxyl groups of said reactive hydrogen-containing material is in the range of about 0.8/1 to about 1/1.

7. The composite structure according to claim 5 wherein the flexible backsizing is characterized by having an ultimate tensile strength in the range of about 300 to about 2,000 pounds per square inch at a corresponding elongation in the range of about 700 to about 200 percent at about 25° C.

8. A method of preparing the composite structure of claim 1 which comprises tufting a yarn through a primary backing of a woven or nonwoven fabric or film to create yarn bundles on its underside, where the integrally adhering said yarn bundles are integrally adhered to and substantially encapsulated by encapsulating them by applying thereto a surface coating of a flexible backsizing and bundle wrap, adhered to the back of the primary backing, said flexible backsizing comprising an inorganic water insoluble granular material of an average specific gravity of greater than 1 and a flexible cured polyurethane binder therefore, and for bonding to the fabric, wherein the said flexible backsizing is deposited by applying a mixture substantially as a topcoat to the back surface of the primary backing and corresponding yarn bundles which comprises from about 50 to about 400 parts by weight of the said granular material per 100 parts by weight of a liquid polyurethane reaction mixture substantially free of volatile solvent and curing the reaction mixture.

\* \* \* \* \*

PO-1050
(5/69)

UNITED STATES PATENT OFFICE
CERTIFICATE OF CORRECTION

Patent No. 3,730,822          Dated May 1, 1973

Inventor(s) Philip G Harris and John A Lovell

It is certified that error appears in the above-identified patent and that said Letters Patent are hereby corrected as shown below:

N/A

Col 1, line 61, "warp" should read -- wrap --.

Col 5, line 19, "liquids" should read -- liquid --.

Col 10, line 29, "carpet of the carpet" should read --surface of the carpet --.

Signed and sealed this 23rd day of April 1974.

(SEAL)
Attest:

EDWARD M.FLETCHER,JR.
Attesting Officer

C. MARSHALL DANN
Commissioner of Patents